Sept. 6, 1932.   W. E. KING   1,876,246

VALVE

Filed Jan. 15, 1929

Walter E. King INVENTOR.

BY Jesse R. Stone
ATTORNEYS.

Patented Sept. 6, 1932

1,876,246

UNITED STATES PATENT OFFICE

WALTER E. KING, OF HOUSTON, TEXAS, ASSIGNOR TO J. S. ABERCROMBIE, OF HOUSTON, TEXAS

VALVE

Application filed January 15, 1929. Serial No. 332,657.

My invention relates to valves or similar devices constructed to regulate or control the passage of fluid through a conducting pipe.

It is often desirable to provide a valve controlling the flow of fluid through a passage so as to allow flow in either direction and it is an object of this invention to construct a valve which will be normally closed but which is adapted to automatically open under a predetermined pressure from either side to allow fluid to pass from the pressure side thereof.

I also desire to form the valve structure so that it may be normally closed, when desired, to shut off the flow of fluid in either direction. Although my device has a wide application, I contemplate employing the same in connection with a fluid operated piston or operating ram so that when the fluid pressure reaches a certain predetermined value the valve will open to release the excess pressure.

In case of use on a line for conducting fluid under pressure, I contemplate employing, in connection with the gate valve or other device for closing the passage of fluid through the line, a by-pass for fluid from the pressure side or upstream side of the passage to the outer side of the gate valve so that the pressure will be equalized on both sides thereof. This will enable the gate valve to be easily closed.

My present improvement is a valve to be used in the by-pass of an apparatus of the character mentioned or in similar situations.

I aim to provide a valve for fluid conducting lines which is normally closed but which may be unseated by fluid under a predetermined pressure.

In the drawing I have shown one embodiment of the invention as applied to an angle in the line, each view being in central longitudinal section.

Figure 1:
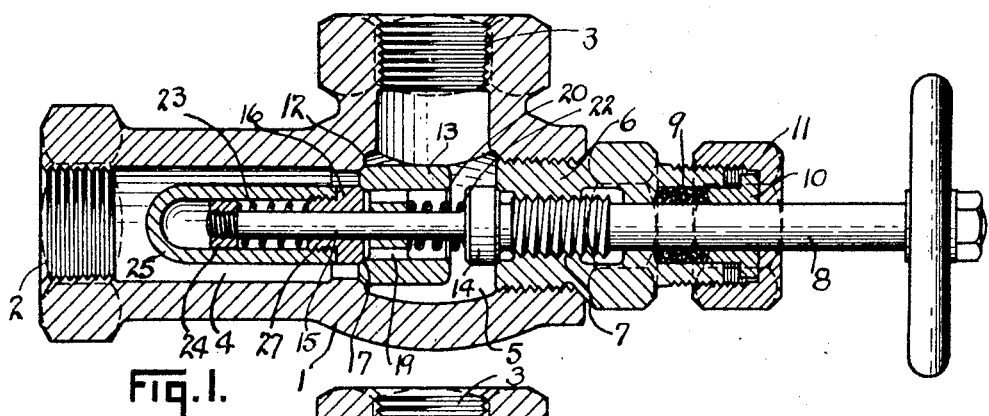
Fig. 1 illustrates the valve in normal closed position.
Figure 2:
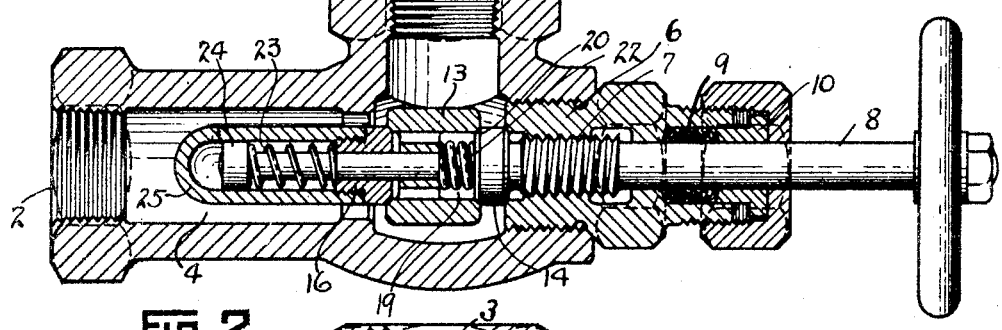
Fig. 2 shows the valve opened in one direction.

My invention is adapted to be employed with different types of valves. The one shown in the drawing is merely illustrative of the inventive idea. The valve body 1 is a tubular valve fitting of ordinary construction having the end 2 threaded for engagement with a pipe leading to a passage for fluid under pressure. The fitting is of L shape and the lateral opening 3 is threaded for engagement with a pipe leading from the rearward side of the valve which tends to close the flow of fluid from the pipe connected at 2. The interior of the valve body forms a passage 4 for fluid and a chamber 5 for the valve is formed centrally of the body.

The passage 4 is closed at one end by a plug 6, which has a threaded connection with the body and is of tubular construction, the interior passage being threaded at 7 for engagement with a threaded portion of the valve stem 8. The outer end of the plug 6 has a recess 9 therein to receive compressible packing which may be tightened about the valve stem 8 by means of a gland 10 and cap 11.

The valve stem 8 projects into the passage 4 and through the valve chamber 5. The passage has a valve seat 12 adjacent the passage 4 and the valve 13 is mounted upon a valve stem to fit said seat. The valve stem has a head thereon formed at 14 and beyond this head the stem is reduced at 15 to receive the valve 13 and a slidable valve member 16.

The valve member 16 is slidable on the reduced stem 15 and is beveled at one end to fit within a valve seat 17 at the outer end of a passage 19 through the valve member 13. The opposite end of the passage through the valve has a seat 20 which may fit against the beveled face of the head 14 upon the valve stem. A spring 22 on the portion 15 of the valve stem bears against the head 14 at one end and against the bearing portion of the valve 13 at the other end and thus tends to hold the said valve resiliently against the seat 12.

The valve member 16 which closes the passage through the valve 13 is held in contact with the said valve 13 by means of a spring 23 bearing against said valve 16 at one end and against a nut 24 on the outer end of the stem 15. The spring 23 is enclosed within a housing 25 which forms a cap enclosing the spring and the interior end of the stem and has a threaded connection at 27 with the valve member 16.

Figure 3:
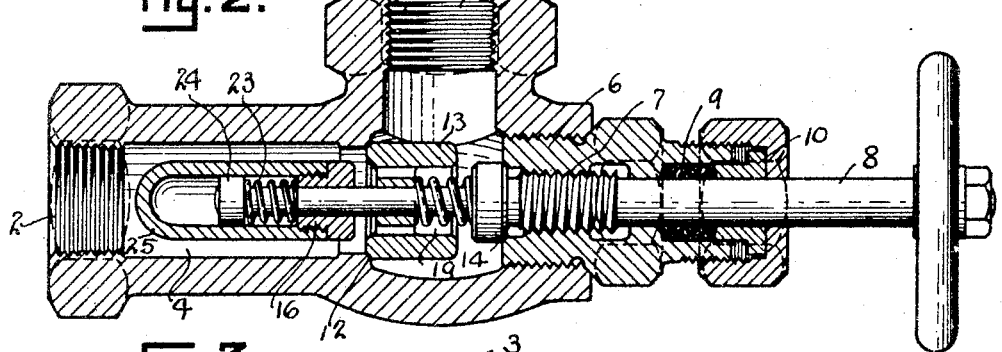
Fig. 3 shows the valve opened in the opposite direction.

The valve structure thus described is normally seated. This is due to the fact that the spring 20 is slightly stronger than the spring 23, the preponderance of pressure tending to hold the valve 13 in the seat 12. At the same time the spring 23 holds the valve member 16 in its seat 17 in the valve 13, thus the valves will be held in closed position until sufficient pressure is exerted on either side to unseat one of the valves. Thus if there is a preponderance of fluid pressure in the passage 4 exerted against the valve 13, said valve will be unseated, allowing fluid to pass out through the opening 3 behind the main gate valve, for which the present valve is intended as a relief, but when the main valve is opened, tending to force the fluid back through the passage 3, it will exert a preponderance of pressure on that side of the valve 13 and will open the valve 16 and close the valve 13. This position of the valves is shown in Fig. 3. The valve 16 is there unseated, allowing a passage of fluid through the opening 19.

Figure 4:
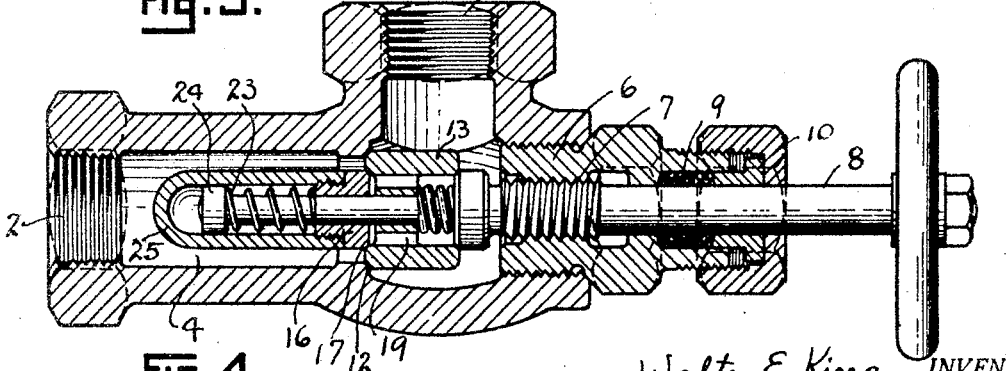
Fig. 4 shows the valve as manually closed so that it can not be automatically opened.

This type of valve is designed particularly for use in a bypass of the character stated, but it is obvious that it has a wide application. It may be closed manually so that it will not be capable of automatic operation by screwing the valve stem 8 inwardly into the position shown in Fig. 4. The head 14 on the valve stem forces the valve member 13 to its seat to close the same and simultaneously closes the passage through the valve.

I have thus provided a valve which is normally closed but which may be opened by a predetermined fluid pressure in either direction, but which is also capable of being manually closed so as to prevent the passage of fluid in either direction. When this device is used with a fluid operated piston the fluid will pass through the passage 4 and open the valve 13 and be forced through the passage 3 behind the piston. When the piston is again forced into open position the fluid behind the piston may surge back through the passage 3 and open the valve 16 and from thence find an outlet through the passage 4.

This is one use to which the valve may be placed but I do not wish to be limited to such application.

What I claim is new and desire to protect by Letters Patent is:

1. In a valve structure having a fluid passage, a valve closing said passage in one direction, said valve having an opening therethrough, a closure for said opening normally seated, but adapted to automatically open in a direction opposite to that of the valve, common means to support said valves adapted also to move said closure and valve into a closed position and prevent automatic opening thereof.

2. A valve structure having a valve chamber therein, a valve seat in said chamber, a valve stem projecting through said chamber, a valve slidable on said stem to fit said seat, said valve having a fluid passage therethrough, means normally closing said passage in all positions of said valve, and means to hold said valve rigidly in its seat.

3. A valve structure having a fluid passage, a valve stem in said passage, a double acting valve member on said stem adapted to close said passage resiliently in both directions, said valve being adapted to automatically open under fluid pressure from either direction, and means operated by said stem to move against said valve member to prevent automatic opening thereof.

In testimony whereof I hereunto affix my signature this 10 day of January A. D. 1929.
WALTER E. KING.